United States Patent
Cao et al.

(10) Patent No.: US 8,332,693 B2
(45) Date of Patent: Dec. 11, 2012

(54) METHOD AND APPARATUS FOR FAILURE NOTIFICATION

(75) Inventors: Wei Cao, Shenzhen (CN); Guoyi Chen, Shenzhen (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 307 days.

(21) Appl. No.: 12/790,603

(22) Filed: May 28, 2010

(65) Prior Publication Data

US 2010/0251037 A1  Sep. 30, 2010

Related U.S. Application Data

(63) Continuation of application No. PCT/CN2008/073103, filed on Nov. 19, 2008.

(30) Foreign Application Priority Data

Nov. 30, 2007 (CN) .......................... 2007 1 0195499

(51) Int. Cl.
    *G06F 11/00* (2006.01)
(52) U.S. Cl. ............... 714/43; 370/228; 370/395.53; 714/4.1; 714/48; 714/56
(58) Field of Classification Search ............ 370/228, 370/395.53; 714/4.1, 43, 48, 56
    See application file for complete search history.

(56) References Cited

U.S. PATENT DOCUMENTS

| 6,751,747 | B2* | 6/2004 | Li ........................ 714/4.1 |
| 7,281,058 | B1* | 10/2007 | Shepherd et al. .......... 709/238 |
| 7,826,348 | B2* | 11/2010 | Farinacci et al. .......... 370/228 |
| 8,004,960 | B2* | 8/2011 | Raj ........................ 370/216 |
| 2001/0037472 | A1* | 11/2001 | Li .......................... 714/4 |
| 2002/0116669 | A1* | 8/2002 | Jain ....................... 714/43 |
| 2005/0083834 | A1* | 4/2005 | Dunagan et al. .......... 370/221 |
| 2006/0133298 | A1* | 6/2006 | Ng et al. ................. 370/254 |
| 2006/0159009 | A1 | 7/2006 | Kim et al. |
| 2007/0253416 | A1* | 11/2007 | Raj ........................ 370/390 |

(Continued)

FOREIGN PATENT DOCUMENTS

CN  1505409 A  6/2004

(Continued)

OTHER PUBLICATIONS

Written Opinion of the International Searching Authority in corresponding PCT Application No. PCT/CN2008/073103 (Feb. 26, 2009).

(Continued)

*Primary Examiner* — Joshua P Lottich
(74) *Attorney, Agent, or Firm* — Leydig, Voit & Mayer, Ltd.

(57) ABSTRACT

A method and an apparatus for failure notification are provided. The method includes: sending, when it is detected that a failure occurs in a multicast label switch path, failure information to a downstream node of a multicast tree where a failed point locates, where the multicast label switch path is established based on a multicast label distribution protocol; and forwarding the failure information through the downstream node, where the failure information arrives at a leaf node of the multicast tree where the failed point locates. According to the method and the apparatus for failure notification of the present invention, finally, the failure information is transmitted to a leaf node. After the failure information is obtained, the leaf node may take appropriate measure to ensure the normal service and improve the reliability of the network.

13 Claims, 1 Drawing Sheet

U.S. PATENT DOCUMENTS

| | | | |
|---|---|---|---|
| 2009/0034413 A1* | 2/2009 | Sajassi et al. | 370/228 |
| 2009/0073988 A1* | 3/2009 | Ghodrat et al. | 370/395.53 |
| 2009/0154346 A1 | 6/2009 | Sun | |
| 2009/0161560 A1* | 6/2009 | He et al. | 370/242 |
| 2011/0058472 A1* | 3/2011 | Owens et al. | 370/228 |
| 2012/0027013 A1* | 2/2012 | Napierala | 370/390 |
| 2012/0057594 A1* | 3/2012 | Boers et al. | 370/390 |

FOREIGN PATENT DOCUMENTS

| | | | |
|---|---|---|---|
| CN | 1805412 A | | 7/2006 |
| CN | 1933423 A | | 3/2007 |
| CN | 1946040 A | | 4/2007 |
| CN | 1960282 A | | 5/2007 |
| WO | WO 2007/086157 A1 | | 8/2007 |

OTHER PUBLICATIONS

1st Office Action in corresponding Chinese Application No. 200710195499.6 (Dec. 27, 2010).

2nd Office Action in corresponding Chinese Application No. 200710195499.6 (Oct. 18, 2011).

State Intellectual Property Office of The People's Republic of China, International Search Report in International Patent Application No. PCT/CN2008/073103 (Feb. 26, 2009).

Aggarwal et al., "Extensions to RSVP-TE for Point-to-Multipoint TE LSPs," draft-ietf-mpls-rsvp-te-p2mp-07.txt, Network Working Group, Internet Draft (Jan. 2007).

Fenner et al., "Protocol Independent Multicast—Sparse Mode (PIM-SM): Protocol Specification (Revised)," RFC4601.txt, Network Working Group, Request for Comments: 4601 (Aug. 2006).

Minei et al., "Label Distribution Protocol Extensions for Point-to-Multipoint and Multipoint-to-Multipoint Label Switched Paths," draft-ietf-mpls-ldp-p2mp-02, Network Working Group, Internet Draft (Jun. 2006).

3rd Office Action in corresponding Chinese Patent Application No. 200710195499.6 (May 29, 2012).

* cited by examiner

METHOD AND APPARATUS FOR FAILURE NOTIFICATION

CROSS-REFERENCE TO RELATED APPLICATIONS

The application is a continuation of International Application No. PCT/CN2008/073103, filed on Nov. 19, 2008, which claims priority to Chinese Patent Application No. 200710195499.6, filed on, Nov. 30, 2007, both of which are hereby incorporated by reference in their entireties.

FIELD OF THE INVENTION

The present invention relates to communication field, and more specifically, to a method and apparatus for notifying a failure on a multicast label switch path established based on a multicast label distribution protocol.

BACKGROUND

Multicast is a technique for one-to-many communication for multi-party. With Multicast technique that is different from widely used Unicast technique, an optimized multicast forward path is established, thereby reducing data duplication and significantly reducing network resource consumptions from multi-party communication. In Multicast technique, a multicast forward tree is a forward path established from one (or a plurality of) source node(s) to multiple receiving nodes, where multicast data is transmitted via the multicast forward tree over the network for achieving an optimal forward efficiency.

Multicast may be implemented using various network protocols which may be categorized into two schemata, i.e., pure Internet Protocol (IP) schema and Multi-Protocol Label Switching (MPLS) schema. In the past, Multicast is deployed using the IP schema, while the MPLS is chiefly employed for Unicast IP forward. With the development of Multicast technique, MPLS Multicast gradually becomes hot issue. The multicast forward tree established based on MPLS is referred as Point to Multipoint (P2MP) Label Switch Path (LSP). The MPLS P2MP may be established with two protocols for selection, i.e., Resource Reservation Protocol-Traffic Engineering (RSVP-TE) protocol, and Label Distribution Protocol (LDP). The extended LDP supporting multicast is usually referred to as multicast Label Distribution Protocol (mLDP).

A P2PMP LSP can be formed eventually based on the RSVP-TE protocol or the mLDP. The mLDP may also generate a Multipoint to multipoint (MP2MP) LSP. For ease of illustration, the description herein is generally made by way of P2MP LSP in MPLS technique. The relating technique principle is also applicable to MPLS MP2MP LSP.

In actual implementation of the network, the topology of a multicast tree is established with the variation of multicast members. When a member joins, multicast protocol may add a branch path based on the network topology, i.e., a graft operation. When a member leaves, an unnecessary path may be deleted, i.e., a prune operation. Thus, a dynamic multicast forward tree is formed with the graft and the prune.

There are a lot of differences between the establishment of a P2MP LSP based on mLDP and the establishment of a P2MP LSP based on RSVP-TE. In the mLDP P2MP LSP, a leaf node actively initiates a joining operation and a prune operation, and a plurality of leafs cooperatively initiate the establishment of a whole structure of the tree. Basically, the multicast tree is created and deleted via a Label Mapping Message and a Label Withdraw Message of LDP.

The multicast forward tree may be dynamically produced in various techniques, and has two basic characteristics.

1. The leaf node knows clearly that it needs to join/leave this forward tree; determines a time for joining the forward tree, and initiates to join the forward tree via the protocol; determines a time for leaving the forward tree, initiates a prune operation, and destructs a corresponding forward branch.
2. The leaf initiates a joining request. Once the leaf successfully joins in, multicast data is forwarded to a corresponding leaf node. When the leaf successfully initiates a prune operation, the forward for related data is interrupted and a corresponding forward branch is withdrawn.

These two basic characteristics ensure that the multicast forward tree may dynamically determine an optimal forward tree based on a recipient, but bring associated problems at the same time.

1. A multicast forward tree is to be created upon the request initiated by the leaf. However, the leaf is not capable of being aware of whether whole multicast forward paths are successfully established. If an upstream node (not an adjacent upstream node, but an upstream router with one or more hops apart) of a certain leaf fails to process the joining request, then the forward path may not be established successfully. Thus, the leaf is not capable of acquiring information indicating that the forward path fails to be established, and accordingly, no further action can be performed.
2. When there is a change of the network topology, an original mLDP P2MP LSP will not be available since another mLDP P2MP LSP is established. Generally, the mLDP may automatically calculate a new path based on route. In some cases, however, the mLDP may not calculate a new path (e.g., when a network device fails), which results in a failure of normal forward. In such cases, the leaf may not acquire failure information or process successfully.

The P2MP LSP established based on mLDP is applicable to various scenarios, e.g., multicast virtual private network (MVPN) and Triple Play. The demands for Triple Play and MVPN multicast are increasing with the development of video services. The wide deployment of multicast is in progress and requires more reliabilities of multicast. The leaf node is usually a service receiver, or a core service provider edge (PE) device. When a failure occurs, the leaf node needs to know that the failure occurs and the reason of the failure, in order to take appropriate measure and ensure the normal service. Also, it is beneficial for the maintenance of the whole network by the network administrator that the leaf node knows the failure in the network. Therefore, the mLDP needs a corresponding mechanism for informing the leaf node of the type of the failure that occurs.

In implementing the present invention, it is discovered by the applicant that the conventional art encounters at least the defects below. According to the LDP/mLDP protocol, a Notification message is employed for notifying a failure during a protocol processing procedure. However, it is limited that the information is only about two neighboring Label Switch Routers (LSRs). When a direct downstream node of the LSR or path where the failure occurs finds out the failure, the node that finds out the failure may inform its upstream node via a Notification message. According to the current specifications of LDP/mLDP protocol, the failure information and the reason thereof may not be successively transferred to the leaf node. Thus, the leaf node may not acquire the failure information in time.

SUMMARY

The object of embodiments of the present invention is to provide a method and an apparatus for failure notification to thereby improve the reliability of the network.

A method for failure notification is provided according to one embodiment of the present invention. The method includes:

sending, when it is detected that a failure occurs in a multicast label switch path, failure information to a downstream node of a multicast tree where a failed point locates, wherein the multicast label switch path is established based on a multicast label distribution protocol; and forwarding the failure information through the downstream node, where the failure information arrives at a leaf node of the multicast tree where the failed point locates.

A switch apparatus for failure notification is further provided according to one embodiment of the present invention. The switch apparatus includes:

a detection unit, configured to detect whether a failure occurs in a multicast Label Switch Path, where the multicast label switch path is established based on a multicast label distribution protocol; and an information unit, configured to send failure information to a downstream node of a multicast tree where a failed point locates when the detection unit detects the failure, where the failure information is forwarded through one or more downstream nodes and arrives at a leaf node of the multicast tree where the failed point locates.

According to the method and the apparatus for failure notification of the present invention, when it is detected that a failure occurs in a multicast label switch path established based on a multicast label distribution protocol, failure information is sent to a downstream node of a multicast tree where a failed point locates. The downstream node that receives the failure information continues to forward the failure information based on a situation. Finally, the failure information is transmitted to a leaf node. After obtaining the failure information, the leaf node may take appropriate measure to ensure the normal service and improve the reliability of the network. Moreover, the network administrator may also acquire the failure information from the leaf node and accordingly maintain the whole network accordingly to thereby further improve the reliability of the network.

DETAILED DESCRIPTION

In embodiments of the present invention, a leaf node is informed of failure information by extending the existing Notification message of mLDP or by defining a new notification message. In the following embodiments, an intermediate node may be an LSR, or other network apparatus, e.g., a switch.

Embodiment One

Figure 1:
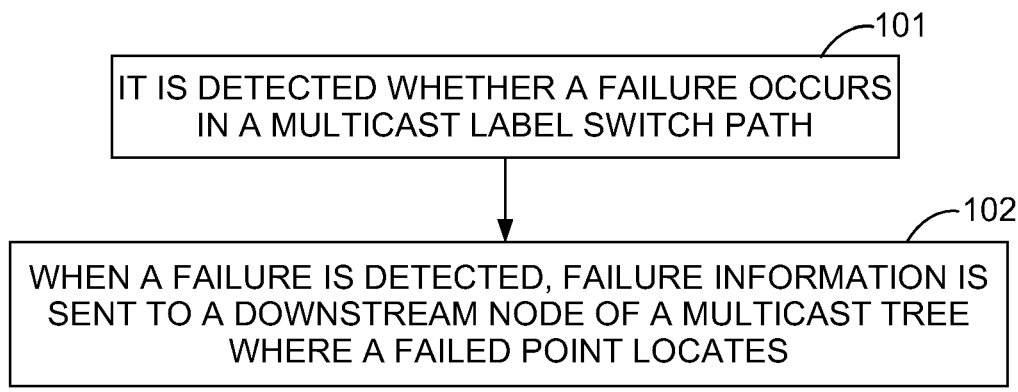
FIG. 1 is a flowchart of a method for failure notification according to a first embodiment of the present invention.

Referring to FIG. 1, a method for failure notification is as follows.

Step 101: It is detected whether a failure occurs in a multicast LSP that is established based on an mLDP.

During the establishment of the P2MP LSP by mLDP, the detection for whether a failure occurs in a multicast LSP may be different from that after the establishment of the P2MP LSP by mLDP. These two cases will be described below.

During the establishment of the P2MP LSP by mLDP, each intermediate node detects whether a failure occurs in the multicast LSP. The detection is usually performed on a status of a direct upstream node of the intermediate node, or performed on a path between the direct upstream node and the intermediate node. The failure cause may include No Route, Label Space Error, or P2MP Incapable. The No Route may include failure of calculating a route to a head node. The Label Space Error may include insufficient label space, label space distribution error, inconsistency between a label space and a label, etc. For example, if the No Route occurs during the establishment of the P2MP LSP by mLDP, a failure may be detected when the LSP fails to be further established upon the receipt of a joining request from a leaf node.

The failure cause during the establishment of the MP2MP LSP by mLDP differs from that during the establishment of the P2MP LSP in that the P2MP Incapable is the failure cause during the establishment of the P2MP LSP while MP2MP Incapable is for the establishment of the MP2MP LSP.

After the P2MP LSP is successfully established, each intermediate node detects whether a failure occurs. The failure cause may include No Route, or the maintaining of the LSP at the moment. The No Route may include situations of an irreparable disconnection of a path to a head node, or a disconnection of a path to a head node without an alternative path, etc. The situations may be incurred by a failure of the network or maintenance for the network at the moment.

The failure notification principle of the MPLS P2MP LSP is also applicable to the MPLS MP2MP LSP. The intermediate node may detect whether a failure occurs during the establishment of the MP2MP LSP by mLDP or after the establishment of the MP2MP LSP by mLDP.

Step 102: When a failure is detected, failure information is sent to a downstream node of a multicast tree where a failed point locates.

The following description is made by way of illustration concerning two scenarios, i.e., during the establishment of the P2MP LSP and after the establishment of the P2MP LSP.

During the establishment of the P2MP LSP by mLDP, when it is detected that the LSP fails to be further established upon the receipt of a joining request from a leaf node, a failure occurs. Then, a failure notification message is generated, and is delivered to the downstream node. The failure notification message is used for carrying failure information, where the failure information may include a failure location and a failure cause. The failure location includes a location of a node where the failure occurs, or a location of a path where the failure occurs, for example, information about which node fails or which route between two nodes fails. The failure information carries an IP address and an identification of the failure node, or carries an IP address and an identification of an end node of the failure route. The failure cause may be referred to step 101.

During the establishment of the P2MP LSP by mLDP, after receiving a joining request from any leaf node, an upstream node may process the request. When a failure is detected, failure information is sent or forwarded to the leaf node via a downstream node. The following description is made as an example where two leaf nodes initiate a joining request separately.

Figure 2:
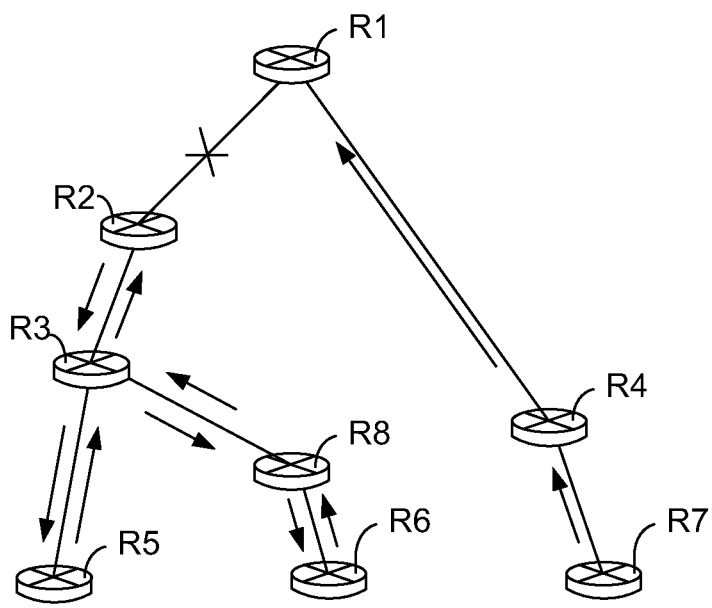
FIG. 2 is a block diagram of the P2MP LSP in the first embodiment of the present invention.

Referring to FIG. 2, leaf nodes LSR R5 and LSR R6 send joining requests. Upstream nodes R3 and R2 process the requests in sequence. However, the R2 finds out that a route fails and the LSP cannot be further established. Moreover, there is no other route that may arrive at a head node R1. Therefore, the R2 actively notifies a downstream node R3 via a failure notification message. The failure notification message is used for carrying failure information. Upon the receipt of the failure notification message, the downstream node R3 delivers the failure notification message along the downstream. The failure notification message finally arrives at the leaf nodes R5 and R6. Thus, the leaf nodes R5 and R6 are informed, via the failure notification message, of the failure occurring on the path between the R2 and the R1 as well as the failure cause.

After the establishment of the P2MP LSP, due to a network failure or maintenance for the network, etc., a failure occurs when it is detected that a path to a head node is disconnected and irreparable, or it is detected that a path to a head node is disconnected while no alternative path is available. Then, a failure notification message is generated, and is delivered to the downstream node. The failure notification message is used for carrying failure information. For example, referring to FIG. 2, a P2MP LSP is successfully established and includes a head node R1, intermediate nodes R2, R3, R8 and R4, leaf nodes R5, R6 and R7. Due to a failure of the intermediate node R2, the R3 finds out that a path to the head node R1 via the R2 is disconnected while no other path to the head node R1 is available. At this point, the R3 generates a failure notification message and delivers it to a downstream node. After processed by one or more downstream nodes, the failure notification message finally arrives at the affected leaf nodes R5 and R6, informing the leaf nodes R5 and R6 of the failure of the leaf node R2 as well as the failure cause.

In addition, for further improving the network management and maintenance capability, the network administrator may acquire the failure information from the leaf node, and may accordingly maintain or repair the failed point based on the failure cause.

In an actual network, there may be a scenario that the leaf node does not need to acquire the failure notification message. For example, there is no need to send/receive multicast data via the multicast forward tree after the leaf node sends a joining request. The leaf node may indicate in the joining request whether a failure notification message is required. When a failure is detected, it is determined first whether the leaf node requires receiving failure information. When the leaf node requires receiving the failure information, a failure notification message is generated. The failure notification message is used for carrying the failure information. And, the failure notification message is finally sent to the leaf node via the downstream node. When the leaf node does not require receiving the failure information, a failure notification message is not generated to thereby avoid sending useless failure information.

The node that detects the failure sends the failure notification message to a downstream node of the multicast tree where the failed point locates. If the downstream node is a leaf node, the leaf node may receive the failure notification message and acquire the failure information from the failure notification message. If the downstream node is an intermediate node, the intermediate node may receive the failure notification message, and forward the failure notification message to its downstream node when the intermediate node finds out that the failure notification message carries the failure information. The failure notification message is forwarded through one or more hops of intermediate nodes, and is finally sent to the leaf node.

When the failure information requires to be carried, the following approaches may be adopted.

A new notification message may be defined. The new notification message may carry failure information. For example, the new notification message may be in a form of an identification bit and an information bit. The identification bit indicates that the notification message carries the failure information. The first M bits of the information bit indicate the LSP where the failure occurs, while the last N bits of the information bit indicate the failure cause. M and N herein are natural numbers. Since each intermediate node may probably be located at a plurality of routes, the first M bits of the information bit need to indicate on which route the failure occurs. There may also be various failure causes, so that the leaf node shall perform a different processing/operation according to a different failure cause. Thus, the last N bits of the information bit may be employed to indicate the specific failure cause.

Alternatively, the failure notification may be realized by extending the existing Notification message of mLDP. A Failure Notification Element and a failure-affected forwarding equivalence class (Optional LDP MP FEC TLV) are encapsulated in the extended Notification message. The Failure Notification Element is used to indicate a failure cause, e.g., No Route, Label Space Error, P2MP Incapable or MP2MP Incapable, etc. The failure-affected forwarding equivalence class is used to indicate a failure location. Since each intermediate node may probably locate at a plurality of LSPs, the failure-affected forwarding equivalence class indicates which P2MP LSP the failure occurs in, or to indicate which MP2MP LSP the failure occurs in. The Failure Notification Element may have a coding value and a form that are adjustable according to actual implements, as long as the coding value and the form may indicate a failure location and a failure cause.

Here is an example for one form of the Failure Notification Element.

| 0 1 2 3 4 5 6 7 8 9 0 1 2 3 4 5 6 7 8 9 0 1 2 3 4 5 6 7 8 9 0 1 |
|---|
| F_NOTI Type    Length = 1                  Error Code |

F_NOTI Type = 2
Length = 1
Error Code: 1 indicates No Route; 2 indicates Label Space Error, e.g., insufficient label space; 3 indicates P2MP Incapable (MP Incapable); 4 indicates Planned Maintenance.

Embodiment Two

Figure 3:
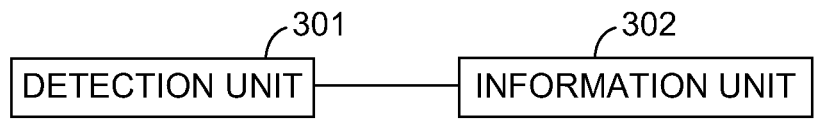
FIG. 3 is a block diagram of a switch apparatus in a second embodiment of the present invention.

Referring to FIG. 3, a switch apparatus for notifying a failure on a multicast label switch path established based on a multicast label distribution protocol may include the following:

a detection unit 301, configured to detect whether a failure occurs in the multicast LSP, where the multicast label switch path is established based on the multicast label distribution protocol; and an information unit 302, configured to send failure information to a downstream node of a multicast tree where a failed point locates when the detection unit detects a failure, where the failure information is forwarded through one or more downstream nodes and arrives at a leaf node.

The information unit may further include:

an information generating subunit, configured to generate a failure notification message, where the failure notification message is configured to carry the failure information;

a sending subunit, configured to send the failure notification message generated by the information generating unit to the downstream node of the multicast tree where the failed point locates; or a forwarding subunit, configured to forward, upon the receipt of the failure notification message from an upstream node of the multicast tree where the failed point locates, the failure notification message to a downstream node.

The switch apparatus may further include:

a determination unit, configured to determine whether a leaf node requires receiving the failure information, and is configured to generate a termination instruction when it is determined that a leaf node does not require receiving the failure information, where the termination instruction is used to control the information unit for terminating the work;

generate an execution instruction when it is determined that a leaf node requires receiving the failure information, where the execution instruction is used to control the work of the information unit. In the present embodiment, the switch apparatus may be a network apparatus with switch function, such as a switch, a two-layer router, etc.

With the description of the foregoing embodiments, it is readily appreciated by those skilled in the art that the present invention may also be implemented with software in combination of a necessary hardware platform, or, of course, may also be entirely implemented with hardware. Based on this understanding, technical solutions of the present invention, or the part which the present invention makes contribution over the background may be embodied in a software product. The computer software product may be stored in a readable storage media such as ROM/RAM, magnetic disc, or optical disc, etc. The software product may include a set of instructions enabling a computer (may be a personal computer, a server, or a network device, etc.) to perform methods according to various embodiments or some parts of the embodiments of the present invention.

The foregoing embodiments are merely preferred embodiments of the present invention. It should be noted that several modifications and variations can be made by those skilled in the art without departing from the principle of the present invention. These modifications and variations shall be construed as fall within the scope of the present invention.

What is claimed is:

1. A method for failure notification in a multicast network, comprising:
    detecting that a failure occurs in a multicast label switch path;
    determining whether a leaf node of a multicast tree requires receiving failure information;
    sending, in response to the detected failure and the determining step, the failure information to a downstream node of the multicast tree in which a failed point is located, wherein the multicast label switch path is established based on a multicast label distribution protocol; and
    forwarding the failure information through the downstream node to, the leaf node of the multicast tree.

2. The method of claim 1, wherein, sending the failure information to the downstream node of the multicast tree which the failed point is located, comprises:
    generating a failure notification message via which the failure information is sent to the downstream node of the multicast tree.

3. The method of claim 1, wherein, sending the failure information to the downstream node of the multicast tree which the failed point is located comprises:
    forwarding, upon receipt of a failure notification message from an upstream node of the multicast tree, the failure notification message to the downstream node of the multicast tree.

4. The method of claim 1, wherein, prior to sending the failure information to the downstream node of the multicast tree in which the failed point is located, the method further comprises:
    determining whether the leaf node of the multicast tree requires receiving the failure information; continuing sending the failure information to the leaf node when it is determined that the leaf node requires receiving the failure information.

5. The method of claim 4, wherein, determining whether the leaf node of the multicast tree in which the failed point is located requires receiving the failure information comprises:
    determining that the leaf node of the multicast tree requires receiving the failure information, when the leaf node indicates in a request for joining the multicast tree that the failure information is required.

6. The method of claim 1, wherein, determining whether the leaf node of the multicast tree in which the failed point is located requires receiving the failure information comprises:
    determining that the leaf node of the multicast tree does not require receiving the failure information, when the leaf node does not indicate in a request for joining the multicast tree that the failure information is required.

7. The method of claim 1, wherein, the failure information comprises a failure location and a failure cause.

8. The method of claim 7, wherein, the failure cause comprises one of the group consisting of No Route, Label Space Error, Point-to-Multipoint Incapable, Multipoint-to-Multipoint Incapable, and ongoing maintenance for the label switch path.

9. The method of claim 8, wherein,
    the No Route comprises one of the group consisting of a failure of calculating a route to a head node, an irreparable disconnection of a path to a head node and a disconnection of a path to a head node without an alternative path; and
    the Label Space Error comprises one of the group consisting of insufficient label space, label space distribution error, and inconsistency between a label space and a label.

10. The method of claim 8, wherein, the failure notification message is an extended Notification message in which a failure notification element and a failure-affected forwarding equivalence class are encapsulated, wherein the notification element is used to indicate the failure cause and the failure-affected forwarding equivalence class is used to indicate the failure location.

11. A switch apparatus in a multicast network, comprising:
    a detection unit, configured to detect whether a failure occurs in a multicast Label Switch Path, where the multicast label switch path is established based on a multicast label distribution protocol;
    a determination unit, configured to determine whether a leaf node requires receiving the failure information, generate a termination instruction when it is determined that the leaf node does not require receiving the failure information, wherein the termination instruction is used to control an information unit to terminate sending failure information, and generate an execution instruction when it is determined that the leaf node requires receiving the failure information, wherein the execution instruction is used to control the information unit to continue to send the failure information; and
    the information unit, configured to send the failure information to a downstream node of a multicast tree in which a failed point is located in response to the determination made by the determination unit when the detection unit detects the failure, where the failure information is forwarded through one or more downstream nodes and arrives at the leaf node of the multicast tree based on determining by the determination unit whether the leaf node requires receiving the failure information.

12. The switch apparatus of claim 11, wherein, the information unit comprises:

an information generating subunit, configured to generate a failure notification message, where the failure notification message is configured to carry the failure information; and a sending subunit, configured to send the failure notification message generated by the information generating unit to the downstream node of the multicast tree.

13. The switch apparatus of claim 11, wherein, the information unit comprises:

a forwarding subunit, configured to forward, upon the receipt of a failure notification message from an upstream node of the multicast tree, the failure notification message to the downstream node of the multicast tree.

* * * * *

UNITED STATES PATENT AND TRADEMARK OFFICE
CERTIFICATE OF CORRECTION

PATENT NO. : 8,332,693 B2
APPLICATION NO. : 12/790603
DATED : December 11, 2012
INVENTOR(S) : Cao et al.

It is certified that error appears in the above-identified patent and that said Letters Patent is hereby corrected as shown below:

Column 7, line 56, "multicast tree which" should read -- multicast tree in which --.

Signed and Sealed this
Twelfth Day of March, 2013

Teresa Stanek Rea
*Acting Director of the United States Patent and Trademark Office*